United States Patent
Imbrogno (10) Patent No.: US 11,952,243 B2
(45) Date of Patent: Apr. 9, 2024

(54) MOVING SYSTEM, METHOD OF MOVING AN ITEM AND RELATED COMPONENTS

(71) Applicant: Ginco Industries Pty Ltd., Adelaide (AU)

(72) Inventor: Gino Paul Imbrogno, Waterloo Corner (AU)

(73) Assignee: Ginco Industries Pty Ltd, Adelaide (AU)

( * ) Notice: Subject to any disclaimer, the term of this patent is extended or adjusted under 35 U.S.C. 154(b) by 0 days.

(21) Appl. No.: 18/298,279

(22) Filed: Apr. 10, 2023

(65) Prior Publication Data

US 2023/0303365 A1 Sep. 28, 2023

Related U.S. Application Data (63) Continuation of application No. 16/338,431, filed as application No. PCT/AU2017/051053 on Sep. 27, 2017, now Pat. No. 11,685,636.

(30) Foreign Application Priority Data

Oct. 4, 2016 (AU) ................................ 2016904015

(51) Int. Cl.
*B66C 13/08* (2006.01)
*B62B 3/02* (2006.01)
*B66C 1/22* (2006.01)

(52) U.S. Cl.
CPC ................ *B66C 13/08* (2013.01); *B62B 3/02* (2013.01); *B66C 1/22* (2013.01)

(58) Field of Classification Search
CPC .............. B66C 13/08; B66C 1/22; B62B 3/02
See application file for complete search history.

(56) References Cited

U.S. PATENT DOCUMENTS

| | | | |
|---|---|---|---|
| 2,839,320 | A | 6/1958 | Hill |
| 3,040,904 | A | 6/1962 | Amour |

(Continued)

FOREIGN PATENT DOCUMENTS

| | | | |
|---|---|---|---|
| CN | 201433079 | Y | 3/2010 |
| CN | 201536797 | U | 8/2010 |

(Continued)

OTHER PUBLICATIONS

IP Australia, Examination Report dated Mar. 2, 2018 in Australian Patent Application No. 2018100181, 5 pages.

(Continued)

*Primary Examiner* — Saul Rodriguez
*Assistant Examiner* — Ashley K Romano
(74) *Attorney, Agent, or Firm* — Inskeep IP Group, Inc.

(57) ABSTRACT

The present invention relates to a racking bay tower construction method, the racking bay including upright members with shelf-frames installed therebetween, the construction method including use of a method of moving an item, the item being a preassembled shelf-frame, between adjacent upright members of a racking bay tower, the shelf-frame moving method including: mounting a first preassembled shelf-frame onto a jig table such that the shelf-frame is in an angular orientation; and lifting the first shelf-frame from the jig table, the jig table being positioned between lower ends of adjacent upright members, to an installation position between upper ends of the adjacent upright members, while maintaining the angular position of the first shelf-frame, and then installing the first shelf-frame in a desired orientation in its installation position; and then mounting a second preassembled shelf-frame onto a jig table such that the second shelf-frame is in an angular orientation; and lifting the second shelf-frame from the jig table, the jig table being positioned between lower ends of adjacent (Continued)

upright members, to an installation position between upper ends of the adjacent upright members but below the installation position of the first shelf-frame, while maintaining the angular position of the first shelf-frame, and then installing the second shelf-frame in a desired orientation in its installation position; wherein the mounting, and the lifting and installing, of subsequent shelf-frames is repeated until the racking bay tower is constructed. The present invention also relates to a jig table when used in the racking bay tower construction method, the jig table including a frame configured to hold a pre-assembled shelf-frame in an angled position. The present invention further relates to a preassembled shelf-frame when used in the racking bay tower construction method, the shelf-frame including at least two longitudinal members and at least two cross members connected together to form an assembled unit. Further still, the present invention relates to racking bay tower constructed by the construction method, the tower including upright members connected by shelf-frames.

16 Claims, 5 Drawing Sheets

(56) References Cited

U.S. PATENT DOCUMENTS

| | | | |
|---|---|---|---|
| 3,900,112 A * | 8/1975 | Azzi | B65G 1/023 211/151 |
| 4,349,171 A | 9/1982 | Baldwin | |
| 4,453,641 A | 6/1984 | Rasmussen et al. | |
| 5,114,024 A * | 5/1992 | Meissner | B65G 1/02 211/175 |
| D423,918 S * | 5/2000 | Hirano | D8/382 |
| 7,134,701 B1 | 11/2006 | Ronning | |
| 8,062,324 B2 | 11/2011 | Shimon et al. | |
| 10,035,030 B2 * | 7/2018 | Pigeon | A62C 3/002 |
| RE48,218 E * | 9/2020 | McAuliffe | B65G 1/14 |
| 11,160,374 B1 * | 11/2021 | Davis | A47F 1/12 |
| 11,685,636 B2 * | 6/2023 | Imbrogno | B66C 13/08 414/217 |
| 2004/0069733 A1 | 4/2004 | Leclerc et al. | |
| 2010/0059952 A1 | 3/2010 | Haley | |
| 2013/0105428 A1 | 5/2013 | Yaniak et al. | |
| 2015/0014262 A1 | 1/2015 | McAuliffe | |

FOREIGN PATENT DOCUMENTS

| | | |
|---|---|---|
| CN | 102235085 A | 11/2011 |
| CN | 202705927 U | 1/2013 |
| CN | 205113385 U | 3/2016 |
| EP | 0072100 A2 | 2/1983 |
| FR | 3029160 A1 | 6/2016 |
| JP | H07-112807 A | 5/1995 |
| JP | H09-104592 A | 4/1997 |
| JP | 2008-248664 A | 10/2008 |

OTHER PUBLICATIONS

Japanese Patent Office, Office Action dated Nov. 29, 2022 with English translation in Japanese Patent Application No. 2021-203928, 6 pages.
Japanese Patent Office, Office Action dated Nov. 29, 2022 with English translation in Japanese Patent Application No. 2021-203923, 8 pages.
Ip Australia, Examination Report dated Apr. 27, 2021 in Australian Patent Application No. 2017308025, 6 pages.
European Patent Office, Extended European Search Report dated May 18, 2020 in European Patent Application No. 17857693.0, 7 pages.
China Patent Office, Office Action dated Mar. 17, 2020 with English translation in Chinese Patent Application No. 201780062067.X, 11 pages.
WIPO, Australian International Search Authority, International Search Report and Written Opinion dated Dec. 19, 2017 in International Patent Application No. PCT/AU2017/051053, 18 pages.

* cited by examiner

MOVING SYSTEM, METHOD OF MOVING AN ITEM AND RELATED COMPONENTS

RELATED APPLICATIONS

This application is a continuation of and claims priority to U.S. patent application Ser. No. 16/338,431 filed Mar. 29, 2019 entitled Moving System, Method Of Moving An Item And Related Components; which is the U.S. National Phase under 35 U.S.C. § 371 of and claims priority to International Patent Application No. PCT/AU2017/051053, International Filing Date Sep. 27, 2017, entitled Moving System, Method Of Moving An Item And Related Components; which claims benefit of and priority to Australian Application No. 2016904015 filed Oct. 4, 2016 entitled Moving System And Method Of Moving An Item; all of which are incorporated herein by reference in their entireties.

TECHNICAL FIELD OF THE INVENTION

The present invention relates to a moving system, a method of moving an item and to related components. The invention has particular application in lifting components, such as construction components, to heights above about 10 metres, preferably within confined environments, for the construction of racking bay towers.

BACKGROUND OF INVENTION

Using cranes or hoists to lift and transport loads between locations is inherently dangerous. Many practices have been developed to manage the risk of injury or death to persons operating, working with, working near, or simply being in an area adjacent to the operational point of a crane. Similarly, practices have been developed to manage the risk of injury or death to persons working in the construction industry. One of the major causes of injury in the construction industry is falls and thus fall-arrest systems have been developed to arrest the fall of a person from heights of above about two metres. Such systems include safety nets, catch platforms and safety harness systems. In Australia and in many countries around the world, stringent work place regulations stipulate what workers can and cannot do and which safety systems and equipment must be in use, particularly in relation to construction at height.

In construction environments where there are space constraints, controlling the load being lifted into position by a crane becomes more problematic. Space constraints increase the risk that the load will strike adjacent structures causing damage to them or the load being lifted by the crane. Typically, responsibility for controlling the swing of the load being craned into position is held by the "dogger" or "dogman". The dogger holds a tagline, a line attached to the load, and uses it to control swing of the load. The dogger is also responsible for safely slinging the load, directing the crane operator, and checking the surrounding area for hazards. When the crane operator's vision is obscured, the dogger provides all instructions to the crane operator to ensure safe movement of the load.

Aspects of the present invention have been developed because of the difficulty of safely lifting loads to heights in confined environments. An example of such a confined environment is when the crane is operating within a building, such as a factory or storage facility. Typically, such environments have structural members, such as product racking, either already in place or under construction in racking bay towers. In such environments, the crane may need to lift loads to heights over 30 metres above the ground. Further, such loads may need to be lifted between existing structures with very little clearance room. This means that extra care and thus extra time must be taken to ensure that the load does not strike anything as it is lifted by the crane into position. This can greatly increase the overall construction costs.

The discussion of the background to the invention herein is included to explain the context of the invention. This is not to be taken as an admission that any of the material referred to was published, known or part of the common general knowledge as at the priority date of this application.

SUMMARY OF INVENTION

An aspect of the present invention relates to a racking bay tower construction method, the racking bay including upright members with shelf-frames installed therebetween, the construction method including use of a method of moving an item, the item being a preassembled shelf-frame, between adjacent upright members of a racking bay tower, the shelf-frame moving method including: mounting a first preassembled shelf-frame onto a jig table such that the shelf-frame is in an angular orientation; lifting the first shelf-frame from the jig table, the jig table being positioned between lower ends of adjacent upright members, to an installation position between upper ends of the adjacent upright members, while maintaining the angular position of the first shelf-frame, and then installing the first shelf-frame in a desired orientation in its installation position; and then mounting a second preassembled shelf-frame onto a jig table such that the second shelf-frame is in an angular orientation; and lifting the second shelf-frame from the jig table, the jig table being positioned between lower ends of adjacent upright members, to an installation position between upper ends of the adjacent upright members but below the installation position of the first shelf-frame, while maintaining the angular position of the first shelf-frame, and then installing the second shelf-frame in a desired orientation in its installation position; wherein the mounting, and the lifting and installing, of subsequent shelf-frames is repeated until the racking bay tower is constructed.

The present invention also relates to a jig table when used in the racking bay tower construction method, the jig table including a frame configured to hold a pre-assembled shelf-frame in an angled position.

The present invention further relates to a preassembled shelf-frame when used in the racking bay tower construction method, the shelf-frame including at least two longitudinal members and at least two cross members connected together to form an assembled unit.

Further still, the present invention relates to racking bay tower constructed by the construction method, the tower including upright members connected by shelf-frames.

In one embodiment, the racking bay tower construction method includes lifting shelf-frames from a jig table to an installation position in conjunction with a moving system that guides the movement of the shelf-frames, which is particularly useful for the construction of very high racking bay towers, such as those higher than, for example, 20 to 25 metres. Thus, according to another aspect of the present invention there is provided a moving method and a moving system that include: a first guide cable mounted between first and second mounting points; a first member arranged for movement along the first guide cable between a first position and a second position, the first member arranged for connection to a shelf-frame to be craned into position; a second guide cable mounted between first and second mounting points, a second member arranged for movement along the second guide cable between a first position and a second position, the second member arranged for connection to the shelf-frame to be craned into position; a lifting support arranged for connection to a moving device and to provide support for the shelf-frame during movement; and wherein when the shelf-frame is connected to each of the first and second members, the shelf-frame is set by that connection at a predetermined orientation and when the lifting support is moved by the moving device the first and second members move along their respective guide cables and maintain the shelf-frame substantially at the predetermined angular orientation.

In the moving system of this embodiment, the arrangement of the first and second guide cables, their associated first and second members, and the connection of the shelf-frame to the first and second members is such as to enable the angular positioning of the shelf-frame to be maintained at the predetermined angular orientation as the shelf-frame is moved, for example upwardly or downwardly, by the moving device. This assists the shelf-frame to move in a controlled and predictable manner enabling it to be readily manoeuvred in confined environments, such as vertically between rows of a racking bay being constructed, at lifting speeds than are safely possible.

Once a first shelf-frame is moved into position, secured in place and removed from the lifting device, a second shelf-frame of identical form can be moved into position below the first shelf-frame. This can be achieved efficiently because there is no need to adjust the positioning of the moving device because the crane line will be in the required position, nor is there any need to change or adjust any of the other components of the lifting system. The second shelf-frame can simply be secured to the first and second member and moved into position. If a second shelf-frame different to the first shelf-frame is to be installed below the first shelf-frame, it may be necessary to adjust the connection between the second shelf-frame and each of the first and second members to a new pre-determined angular orientation.

In accordance with an embodiment of the invention, the moving device is a crane or the like with a hook or other arrangement for connection to the lifting support. The lifting support includes a lifting beam which supports the shelf-frame and thereby enables movement of the shelf-frame when the lifting support is moved by the crane. The lifting support is preferably secured to the shelf-frame to prevent inadvertent release by means of pins or other appropriate connectors or connections.

The first and second guide cables of this embodiment may adopt different forms, for example a cable, chain, rope, rail, rod, track or other component, either non-rigid or rigid. The first and second guide cables each establish a path of travel along which their associated first and second member can be moved and that path of travel must be substantially repeatable each time the associated first or second member is moved therealong.

When the first and second guide cables are in the form of non-rigid members, such as a length of metal cable, the non-rigid members must be tensioned between the first and second mounting points to ensure repeatability of the path of travel. Any substantive lateral movement of the guide cable will impact on the repeatability of the path of travel.

The first and second guide cables may, in some circumstances, also be restrained at points along their length so as to control movement, for example lateral movement, of the guide cables to better ensure repeatability of the path of travel.

The first and second guide cables are preferably arranged to extend substantially vertically and are each arranged to be mounted on a respective upright member.

Each of the first and second members preferably includes a moving member, such as a roller guide, which is configured to engage with its respective guide cable and in this way be guided to move along the path of travel established by the guide cable. In one form, the roller guide includes a series of paired rollers, the guide cable arranged to run between each pair of rollers. In another form, each of the first and second members includes a wheel or other member arranged to run along or within a body of the guide cable. In such an instance, the guide cable may be formed as an elongate generally U-shaped cross-sectional member.

Attached to or integrally formed with each of the moving members, may be an offset arrangement or bracket. Such an offset bracket provides a connection point for connection with the item and is shaped to offset the shelf-frame relative to the guide cable and/or other adjacent structure(s) such as the upright members so as to prevent the shelf-frame contacting the same when the shelf-frame is moved under the action of the moving device. The offset brackets holds the shelf-frame at a required predetermined orientation, for example angled to the horizontal, to enable the shelf-frame to fit between the guide cable and/or other adjacent structure(s) such as the upright members.

The jig table referred to above preferably includes a frame for holding a lifting support and is further configured to hold a shelf-frame located on the lifting support in an angled position. In a preferred form, the angled position is identical or substantially identical to the angular orientation mentioned above.

The jig table is preferably arranged to be readily movable between locations and to this end may include at least one wheel. In accordance with an embodiment of the invention, the jig table includes multiple legs and each leg is wheeled.

The frame of the jig table is preferably arranged so that a shelf-frame can be connected to another component, such as an offset bracket, without the need to move the shelf-frame off or away from the jig table. This prevents or reduces manual handling of the shelf-frame.

In another aspect, the present invention relates to a temporary support for supporting upright members during construction of a tower of a racking bay, the temporary support including a link arm arranged to enable temporary connection between a first upright member and a second upright member of the racking bay, and wherein in use the link arm is located in an open area that is outside of the tower of the racking bay.

Preferably, the link arm is movable in use between a first position and a second position whilst remaining in the open area. In the first position, the link arm is arranged for connection between the first upright member and the second upright member. In the second position, the link arm is arranged for connection between the second upright member and a third upright member of the racking bay.

In one embodiment, the temporary support further includes a first outrigger arm and a second outrigger arm, said first outrigger arm arranged in use for connection to the first upright member and the second outrigger arm arranged in use for connection to the second upright member, the link arm in the first position arranged to extend between the first and second outrigger arms, and the link arm in the second position arranged to extend between the second outrigger arm and a third outrigger arm arranged for connection to a third upright member.

The connection between the first outrigger arm and the link arm is preferably releasable. The connection between the link arm and the second outrigger arm is preferably such as to enable the link arm to be moved thereabout so as to enable the link arm to be moved from the first position to the second position whilst remaining in the open area outside the tower of the racking bay.

The connection between the link arm and the second outrigger arm is preferably of the type that includes a rod extending through an aperture so as to allow the rod to rotate with respect to the aperture.

The present invention also provides in other individual aspects, a guide member, an outrigger arm, and a link arm.

BRIEF DESCRIPTION OF DRAWINGS

Embodiments of the aspects of the invention will now be described, by way of example only, with reference to the accompanying drawings in which.

DETAILED DESCRIPTION

The following embodiment of the invention explains the use of a construction method with reference to the erection of a racking bay tower within an existing building. The invention is not intended to be limited to only such a use and those skilled in the art will appreciate that the invention can be used in many different applications and environments. However, the construction method of embodiments of the invention are particularly advantageous when used in confined environments.

Figure 1:
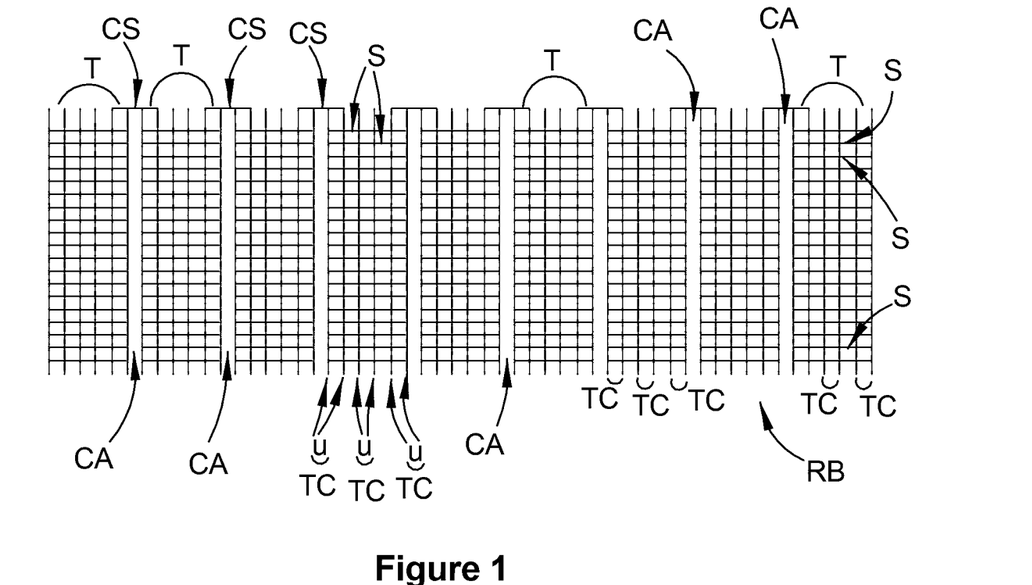
FIG. 1 is a cross-sectional vertical view of a racking bay.

With regard to the broadest aspect of the present invention, FIG. 1 is a cross-sectional vertical view of a completed racking bay RB. The racking bay RB is formed from a series of towers T separated by crane aisles CA. As shown in FIG. 1, the tops of adjacent towers T are connected by a connection structure CS to provide stability to the racking bay RB. The towers T have a height of about 32 metres, but the invention is not limited to use with or construction of towers T of such a height. However, it is envisaged that the method of some embodiments of the invention will be of particular value where the height that an item must be craned to is over about 10 metres.

Each tower T includes multiple rows of paired upright members U forming the length of the tower T (i.e. rows extending into the page of FIG. 1). Each row of any tower T is formed by sets of paired upright members U which establish the width of the tower T. The two upright members U of such a pair are connected together to form a truss column TC. This connection is typically by way of horizontal and diagonal members. Most of the towers T in FIG. 1 have a width established by three truss columns TC per row, whilst the outermost towers T only include two truss columns TC per row. This arrangement of course may vary.

Each tower T includes multiple horizontally extending shelves S which typically provide storage across the full width and length of the tower T.

Figure 2:
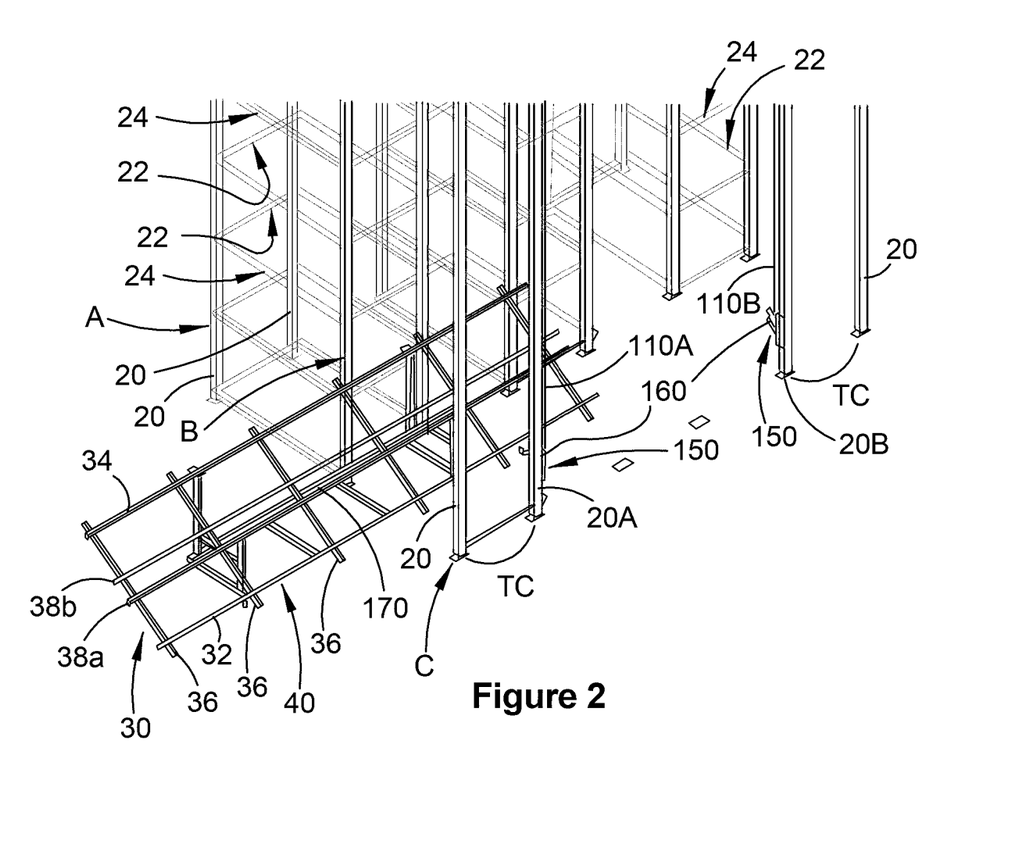
FIG. 2 is an isometric view of a lower part of one of the towers of the racking bay shown in FIG. 2.

FIG. 2 shows schematically the ground level part of one of the towers T of a racking bay RB which is still under construction. The completed part of the tower T is located between first and second rows A, B of column upright members 20, each row A, B including six upright members 20 that form three truss columns TC. To improve the clarity of FIG. 2, the horizontal and diagonal members of each truss column TC are not depicted. The arrows marked A and B point to the first upright member 20 of each row that extends generally across the page of FIG. 2.

The completed section of racking frame 10 includes horizontal members 22 extending between adjacent upright members in the same row and horizontal members 24 extending between aligned upright members of adjacent rows A, B. As represented here, each of these horizontal members 22, 24 were individually hoisted, installed and then secured at the required position along the height of the upright member 20. In this way, the horizontal members 22, 24 stabilise the upright members 22 and also provide connection points for potential stacking platforms/shelves or the like at spaced locations along the length of the upright members 20. It will be appreciated that the individual craning and installation of such horizontal members 22, 24 is very time consuming. Also, as explained previously, there are significant dangers associated with craning loads in confined environments and limitations on how construction workers must work in such environments.

FIG. 2 also shows a third row C of upright members 20. The arrow marked C in FIG. 2 points to the first upright member of this third row of upright members. No individual horizontal members 22, 24 have been established between the second and third rows B, C of upright members 20. Rather, in accordance with the broadest aspect of the present invention, a modular array of horizontal members, in the form of a pre-assembled shelf-frame 30, will be used as an alternative to installing individual horizontal members 22, 24. The shelf-frame 30 is assembled and constructed at ground level, either on site or offsite, and is then lifted into position between upright members 20.

In FIG. 2, the shelf-frame 30 is shown ready for installation between the second and third rows B, C of upright members 20. It will be noted that the third row C only includes the outer most truss columns TC. The middle truss column TC is not installed at this stage for buildability reasons.

Multiple shelf-frames 30 will be installed between the second and third rows B, C of upright members 20 in accordance with the construction method of the broadest aspect of the present invention. The shelf-frames 30 will be spaced vertically along the length of the upright members 20 and secured thereto so as to form individual shelves of the tower T. The shelf-frames 30 can be directly secured to the adjacent upright members 20 without need of any intervening members.

The illustrated shelf-frame 30 includes two elongate members 32, 34 that are arranged to extend in a lengthwise direction parallel to the rows of uprights B, C and six cross members 36 connected perpendicularly to the two elongate members 32, 34. Typically, the shelf-frame 30 will include one cross member 36 per upright member 20 included in a completed row of the tower T and thus, in accordance with this embodiment, includes six cross members 36. The shelf-frame 30 as illustrated also includes two additional elongate members 38a, 38b. These additional elongate members 38a, 38b are provided in this embodiment to locate the inner edge of pallets located on the shelf-frame 30.

The shelf-frame 30 is shown in FIG. 2 mounted on a jig table 40. In this embodiment, each leg of the jig table 40 is mounted on wheels to facilitate movement of the assembled shelf-frame 30 to the installation location. However, it will be appreciated that a wheelbarrow type arrangement would also facilitate movement of the jig table 40. The wheels could also be replaced with one or more skids.

Figure 7:
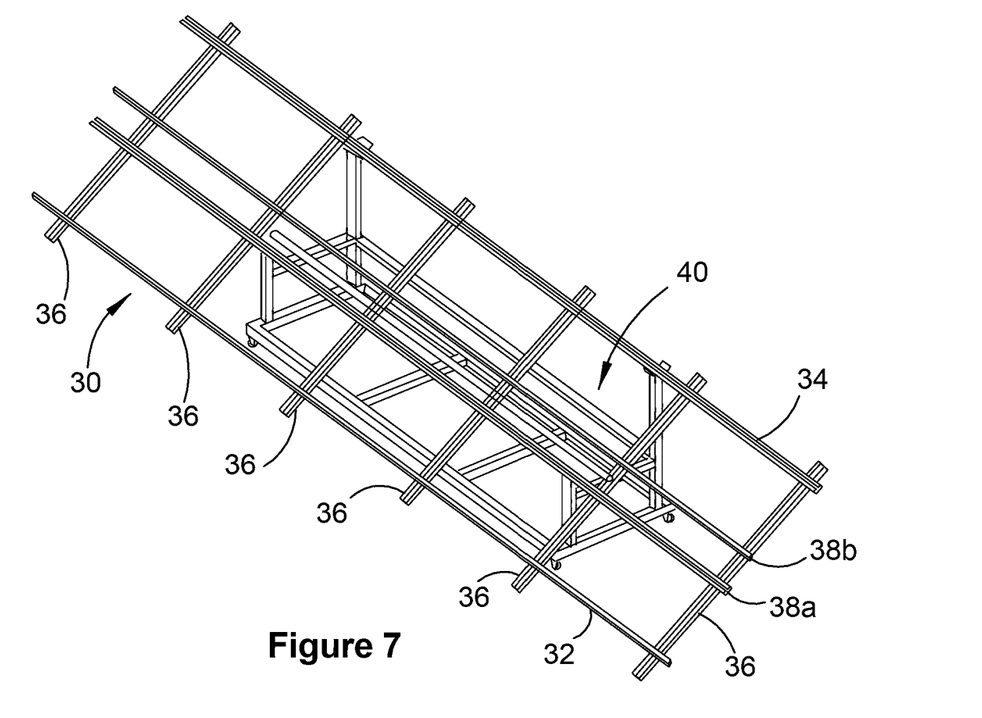
FIG. 7 is an isometric view of a shelf-frame according to an embodiment of an aspect of the invention connected to a lifting beam and resting on a wheeled jig table in accordance with an embodiment of an aspect of the invention.

It will be appreciated that shelf-frames 30 in accordance with an embodiment of the invention may either be manufactured at the installation site or at a distal location. As will be explained later, the wheeled jig table 40 also positions the shelf-frame 30 at a desired angular position during a first stage of the installation process. The wheeled jig table 40 and shelf-frame 30 are also illustrated in FIG. 7.

In order to install each shelf-frame 30 between the second and third rows B, C, each shelf-frame 30 must be individually hoisted by a crane to the correct installation position. Once in the correct installation position, the shelf-frame 30 must be secured to the upright members 20 of the second and third rows B, C. To avoid interference, the uppermost shelf-frame 30 must be installed first and the remaining shelf-frames 30 are installed therebelow in order from the uppermost to the lowermost.

Given the cumbersome nature of each shelf-frame 30, its dimensions and the confined environment between adjacent rows B, C, craning the shelf-frame 30 into position using conventional techniques can be problematic. Accordingly, a preferred moving method has also been developed to guide movement of the assembled shelf-frame 30 as it is craned into the required position. An embodiment of such a moving method will now be described.

Included for use with this exemplary moving method is a first guide cable 110A mounted between first and second mounting points on an upright member 20A. A first member, in the form of a roller guide 150 with attached offset bracket 160 is arranged for movement along the first guide cable 110A. The first member is arranged via the offset member 160 for connection to a shelf-frame 30 to be craned into position. A second guide cable 110B is mounted between first and second mounting points of an upright member 20B. The second member, in the form of another roller guide 150 with attached offset bracket 160, is arranged for movement along the second guide cable 110B. The second member is arranged via its associated offset member 160 for connection to the shelf-frame 30. A more detailed explanation of the configuration of each roller guide 150 will be provided later in connection with FIG. 5.

A lifting support 170 is arranged for connection to a moving device such as a crane (not shown). The lifting support 170 provides support for the shelf-frame 30 during movement by the crane. The shelf-frame 30 is connected to each of the first and second members at a predetermined orientation so that when the lifting support 170 is moved by the moving device, each of the first and second members 150 moves along their respective guide cables 110A, 110B and maintains the shelf-frame 30 substantially at the predetermined angular orientation.

With reference to FIG. 2, the first guide cable 110A and second guide cable 110B as illustrated are each formed by a length of metal cable. The first length of metal cable is attached to the first of the upright members 20A and the second length of metal cable is attached to a second of the upright members 20B. Upright members 20A and 20B are common to the same row (e.g. row C) and are the uprights adjacent the gap where the middle truss column TC will later be installed. The methodology for securing each guide cable 110A, 110B to its respective upright member 20A, 20B would normally be identical. Accordingly, the method of securing the first guide cable 110A will only hereafter be described.

First guide cable 110A is secured at either end to the upright 20A so that in use, the guide cable 110A retains a required tension. Guide cable 110 is preferably a metal cable but may be chain, rod, rope or other member.

Figure 3:
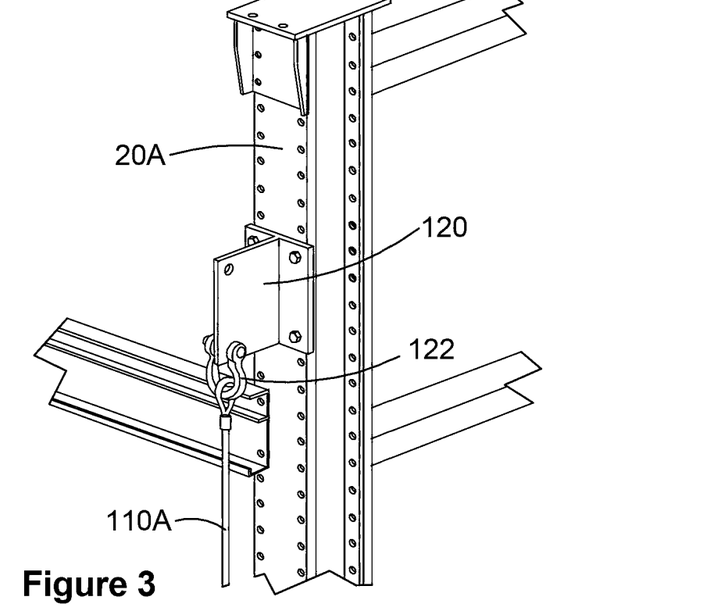
FIG. 3 is an isometric view showing a top cable bracket secured to an upright member.

As best shown in FIG. 3, the top end of the cable 110A is secured to the upper most end of the upright 20A using a top cable bracket 120. The top cable bracket 120 may adopt many different forms but as illustrated includes a simple T-bracket 120 arranged to be bolted to the upright member 20A. A shackle 122 enables connection of the upper end of the cable 110A to the cable bracket 120. The bottom end of the cable 110A is secured to the lower most end of the upright member 20A, preferably just above ground level, using a bottom cable bracket 130. The bottom cable bracket 130 may adopt many different forms but for ease of manufacture and installation, preferably adopts a configuration similar to the top bracket 120. A cable tensioning device (not shown) is provided, typically at the bottom end of the cable 110A, to ensure the proper tensioning of the cable 110A. Various suitable cable tensioning devices will be known by a person skilled in the art.

As best shown in FIG. 3, when the cable 110A is properly secured between the top and bottom cable brackets 120, 130 it is spaced horizontally from the upright member 20A. To ensure that this spacing is maintained along the full height of the upright member 20A, and to prevent excessive lateral movement of the cable 110, cable guides 140 will typically need to be installed along the upright member 20A.

Figure 4:
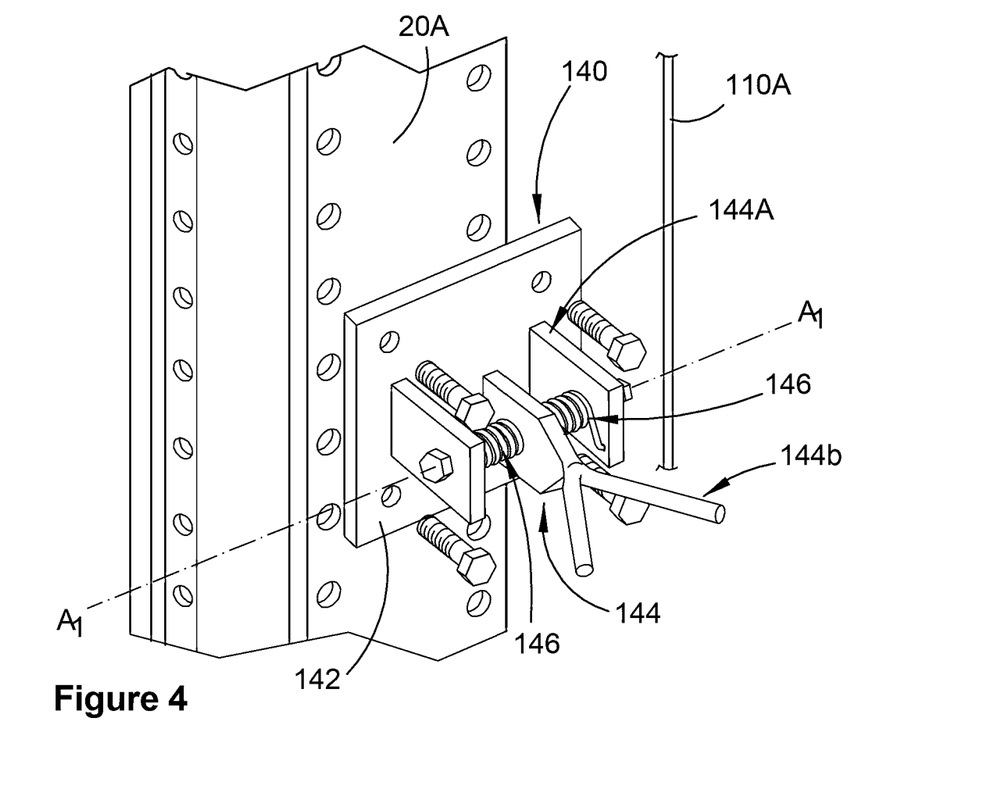
FIG. 4 is an isometric view showing a cable guide ready for connection along the length of the upright member shown in FIG. 3.

FIG. 4 illustrates one of the cable guides 140 prior to attachment to the upright member 20A. Cable guide 140 includes a base 142 arranged to be bolted to the upright member 20A and a pivotable guide member 144. Guide member 144 has an inner end 144a arranged for spring loaded pivotal movement about a longitudinal axis $A_1$ and a V-shaped outer end 144b.

In FIG. 4 only part of the cable 110A is shown. However, it should be understood that, in use, cable 110A passes through the V-shaped outer end 144b of the guide member 144 so that lateral movement of the cable 110A is limited by contact with the V-shaped outer end 144b. Guide member 144 is biased by two springs 146. One spring biases the guide member 144 to pivot in a first direction and the other spring biases the guide member 144 to pivot in a second opposite direction. In this way, the guide member 144 is normally held in a neutral position as shown in FIG. 4.

Figure 5:
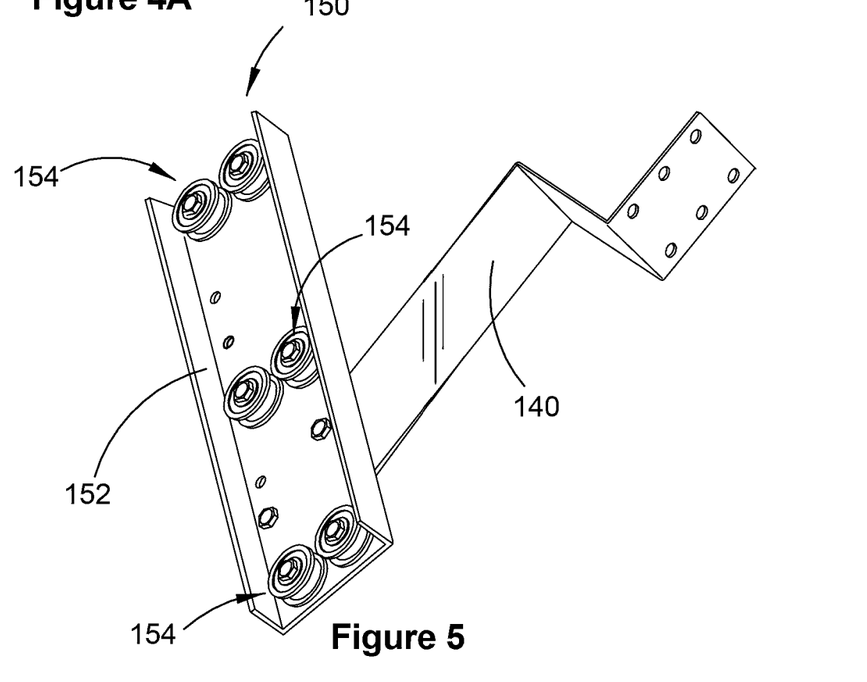
FIG. 5 is an isometric view of a roller guide with attached offset bracket.

FIG. 5 illustrates one of the previously mentioned roller guides 150, shown fitted with an offset bracket 160. As previously described in relation to FIG. 2, one roller guide 150 is fitted to each of the guide cables 110A, 110B. As will be later explained in more detail, each roller guide 150 helps to guide and limit movement of the shelf-frame 30 as it is moved into position by the crane. The shelf-frame 30 is located on the lifting support 170 which is attached to a crane via the crane's hook.

The offset bracket 160 attached to the roller guide 150 has two functions. Firstly, it provides a mechanism by which one of the shelf-frames 30 can be secured to the roller guide 150. Secondly, the offset bracket 160 is shaped to offset the shelf-frame 30 relative to the upright member 20A when the shelf-frame 30 is being craned into position and/or to hold the shelf-frame 30 at a required angle relative to the upright member 20A. In this way, the shelf-frame 30 will be prevented from striking the upright member 20A and will also be delivered to the rigger at a required angular orientation. The size and shape of the offset bracket 160 will vary depending on the shelf-frame that is being craned into position.

Roller guide 150 is arranged to be mounted about the guide cable 110A so that when the shelf-frame 30 is being craned into position, roller guide 150 will travel upwardly along the length of the guide cable 110A. Roller guide 150 travels upwardly along the guide cable 110A as a consequence of its attachment to the shelf-frame 30 which is located on the lifting support 170. Hence, roller guide 150 is in effect pulled upwardly by the crane along the length of the guide cable 110A. As will be explained later, shelf-frame 30 and each roller guide 150 are also preferably connected to the lifting support 170.

It will be appreciated that as the roller guide 150 is arranged to be pulled along the guide cable 110A, the guide cable 110A establishes a path of travel. Provided the location of the guide cable 110A does not substantially move, for example by ensuring the cable 110A is held in tension between its upper and lower connections to the upright 20A, the path of travel of the roller guide 150 as it moves along the cable 110A will be repeatable, controlled and predictable. This means that the path of travel of the shelf-frame 30 connected between the two roller guides 150 as it is moved by the action of the crane, will also be repeatable, controlled and predictable, which is advantageous and preferred.

Although the roller guide 150 and offset bracket 160 are described and illustrated herein as separate members, it should be understood that this need not necessarily be the case. The features of the offset bracket 160 may be incorporated with the roller guide 150 to form a roller member. However, it is envisaged that the ability to remove one offset bracket 160 from the roller guide 150 and replace it with another, perhaps one of a different shape may be advantageous. A different shaped or sized offset bracket 160 may be configured to hold an item at a different predetermined orientation, which might be necessary to accommodate an item of different size and/or shape, or a different sized spacing between the rows of upright members through which the item is to be moved.

Figure 6:
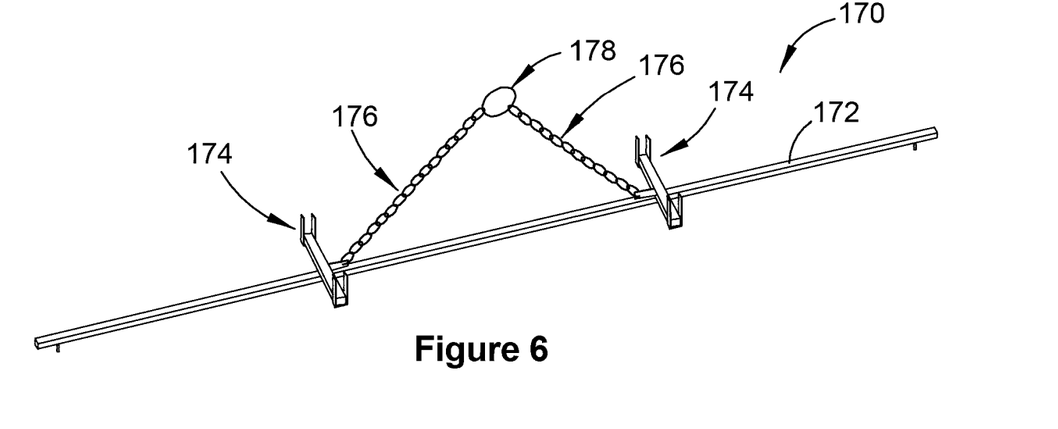
FIG. 6 is an isometric view of a lifting beam.

As best shown in FIG. 6, lifting support 170 includes a central longitudinal member 172, a pair of cradles 174, crane chains 176, and crane ring 178. The cradles 174 are configured to receive parts of the shelf-frame 30 when the shelf-frame 30 is seated thereon. Crane ring 178 is configured to receive the hook of a crane so as to enable hoisting of the lifting support 170 and thus also the shelf-frame 30 seated on the cradles 174 of the lifting support 170.

Although not shown in FIG. 6, in use each end of the central member 172 of the lifting support 170 is arranged to be connected to one of the roller guides 150. This connection is by way of a chain 179 (FIG. 8), rope or other such connection and provides the means to pull the roller guide 150 from the top of the guide cable 110A to the bottom of the cable 110B simply by lowering the lifting support 170 to the ground. The connection also prevents the roller guides 150 from lowering down the guide cables 110A, 110B once the offset bracket 160 is disconnected from the shelf-frame 30 following connection of the shelf-frame 30 in position on the upright members 20. This connection also provides means for restricting unwanted movement of the lifting support 170. More particularly, as one end of the central members 172 is connected to upright member 20A via roller guide 150 and guide cable 110A, and the other end of the central member 172 is connected to upright member 20B via roller guide 150 and guide cable 110B, movement of the lifting support 170 is limited within the range of the chains 179. Accordingly, although the lifting support 170 can be freely lifted and lowered vertically by the crane, side-to-side movement either horizontally or end to end, and spinning movement, is restricted due to the central member's 172 connection to the pair of roller guides 150 by the chains 179 and when the shelf-frame 30 is connected to the lifting support 170, and also by the connection of the shelf-frame 30 to each roller guide 150 via its respective offset bracket 160, which again is advantageous and preferred.

As best shown in FIG. 5, roller guide 150 includes a U-shaped body 152 that provides a connection point for the offset bracket 160. Body 152 also provides mounting points for three pairs of grooved rollers 154 which are spaced along the length of the body 152. Guide cable 110A is arranged to extend through each pair of grooved rollers 154. The number of pairs of rollers 154 mounted on the roller guide 150 may vary depending on the configuration of the roller guide. It should also be understood that although roller guide 150 includes pairs of rollers 154, it is envisaged that the roller guide 150 could be replaced with another form of guide arrangement that guides movement along the guide cable 110A. For example, the rollers 154 may be replaced with one or more tracks that in use run along the guide cable 110A or they may be replaced with a member, such as a tube or the like, through which the cable 110A would extend. Alternatively, a modified arrangement might include a body including at least one roller wheel extending therefrom and which is arranged to run or slide within or on a track which replaces the previously described metal cable 110A. The track might be formed by a generally U-shaped cross-sectional member.

Returning to FIG. 2, and in accordance with this embodiment, a method of the guided movement of a shelf-frame 30 into the required position on the tower T and securing it thereto will now be explained. This method is similar to the non-guided movement described above with reference to the broadest aspect of the present invention.

Firstly, a lifting support 170 is positioned on a wheeled jig table 40. A shelf-frame 30 is then positioned on the wheeled jig table 40 so that it is located on the cradles 174 of the lifting support 170. Typically, the shelf-frame 30 would be secured to the lifting support 170 using some form of connectors, for example keeper pins. Although the lifting support 170 is described as being positioned on the wheeled jig table 40 before the shelf-frame 30 is positioned on the jig table 40, this may not necessarily be the case.

The wheeled jig table 40 is then wheeled into position between the second and third rows B, C. The wheeled jig table 40 is arranged so that the shelf-frame 30 is held in an angular orientation. The angle is set so that the wheeled jig table 40 can be easily wheeled between the second and third rows of uprights B, C without any part of the shelf-frame 30 striking the upright members 20. It will be appreciated that the angle at which the shelf-frame 30 sits may vary depending on the particular shelf-frame.

Whilst still supported on the wheeled jig table 40, the shelf-frame 30 is positioned so that the offset bracket 160 of each roller guide 150 can be secured, for example by bolting, to the required points on the shelf-frame 30. The angle that the shelf-frame 30 is held by the wheeled jig table 40 is also preferably set so as to make connection of the shelf-frame 30 to the offset brackets 160 possible without need for lifting or substantial adjustment of the positioning of the shelf-frame 30. The shelf-frame 30 is connected to the offset brackets 160 so that it is held in a predetermined angular orientation.

Once the connection between the shelf-frame 30 and each of the offset brackets 160 is completed, each end of the shelf-frame 30 is held firmly between the pair of offset brackets 160 in a manner that prevents side-to-side movement of the shelf-frame 30. The free end of the chain 179 of each roller guide is then connected to the lifting support 170.

The crane hook can then be connected to the crane ring 178 of the lifting support 170 so that the crane can be used to lift the shelf-frame 30 off the jig table 40. Once the shelf-frame 30 is clear of the jig table 40, the jig table 40 is wheeled clear of the tower T. Jig table 40 can then be fitted with another lifting support 170 and another shelf-frame 30 in anticipation of another shelf-frame 30 installation.

The crane can then be used to lift the shelf-frame 30 attached thereto vertically to its required connection height within the tower T. It will be appreciated that the uppermost shelf-frame 30 of the tower T must be installed first, followed in height order with the remaining shelf-frames 30.

As the crane lifts the lifting support 170 and shelf-frame 30 vertically away from the wheeled jig table 40, the roller guides 150 will be pulled upwardly along the guide cables 110A, 110B. As mentioned previously, movement of the roller guides 150 is restricted due to the engagement between each pair of grooved rollers 154 and the associated tensioned guide cable 110A, 110B. The intention is for the roller guides 150 to move along a path of travel established by the guide cables 110A, 110B. In this instance, the path of travel extends substantially vertically. The guide cables 110A, 110B are kept in tension and also restrained along their length by the cable guides 140 so as to prevent movement. In this way, the path of travel along which the roller guides 150 are moved is repeatable, meaning in the context of the described embodiment, that the roller guides 150 can be moved upwardly and downwardly substantially vertically over and over again along the same path.

It will also be appreciated that because the shelf-frame 30 is connected to the roller guides 15 via the offset brackets 160 in the predetermined angular orientation, the shelf-frame 30 can also be moved substantially vertically parallel to the path of travel whilst being retained in that orientation. Further, because the shelf-frame 30 is connected between the two offset brackets 160 that are connected to their respective roller guides 150, the shelf-frame 30 is restrained from end to end type movement in a direction parallel to the rows of uprights 20. This is because the horizontal spacing between the two roller guides 150 is determined by the horizontal distance between the guide cables 110A, 110B. As the guide cables 110A, 110B are tensioned and are restrained from any significant lateral movement, that horizontal distance is substantially fixed. It will also be appreciated that the shelf-frame 30 is located on the lifting support 170 and as such the roller guides 150 will be pulled along their respective cables 110A, 110B substantially evenly. Accordingly, the shelf-frame 30 is restrained to move upwardly and downwardly under the action of the crane whilst being retained in the predetermined angular orientation. The shelf-frame 30 will not move to any significant amount other than in an end-to-end direction in a generally horizontal plane, nor will it roll or yaw to any significant amount. In this manner, the orientation of the shelf-frame 30 is substantially maintained in the predetermined angular orientation whereby it will not strike any of the upright members 20 as it is moved into position by the crane, which again is advantageous and preferred.

Importantly, a tagline does not need to be attached to the lifting support 170 due to the positioning of the shelf-frame 30 in accordance with the present invention. This means that the impact of the weight of the tagline does not need to be counteracted and further there is no requirement for a dogger to ever stand directly below the lifting support 170. This provides a safety improvement because the dogger is not underneath the shelf-frame 30 should it accidentally fall. Further, the dogger is not required to spend significant time looking upwardly at a sharp angle which may cause injury. Finally, as the predetermined angular orientation of the shelf-frame 30 is maintained during lifting by the crane, it is anticipated that the hoisting speed of the crane will be increased as compared to what would otherwise be possible.

Once the shelf-frame 30 reaches its required attachment position and with the crane still holding the load of the shelf-frame 30, riggers will capture the shelf-frame 30 and will disconnect the connections to the offset brackets 160. In the preferred embodiment, the offset brackets 160 and connected cable guides 150 will then simply hang by the chains 179 from the lifting support 170. Once released from the offset brackets 160, the shelf-frame 30 can be connected to the uprights 20 of the second and third rows B, C so as to secure the shelf-frame 30 within the tower T.

Once the shelf-frame 30 is securely attached to the tower T, the lifting support 170 is disconnected from the shelf-frame 30. If keeper pins are used to connect the lifting support 170 to the shelf-frame 30, they will be connected to the lifting support 170 on lanyards or the like. This prevents inadvertent release to the ground which could cause injury to someone below.

The crane then lowers the lifting support 170 to ground level. Due to the chains 179 that are still connected to the cable guides 150, lowering of the lifting support 170 will pull the cable guides 150 downwardly along their respective guide cables 110A, 110B to return them to their original starting point. The crane hook can then be released from the lifting support 170, and then the lifting support 170 can be taken away. This entire process can then be repeated to install the next shelf-frame 30 immediately below the previously installed shelf-frame 30.

Although the chains 179 connected between the lifting support 170 and the cable guides 150 are described as providing a preferred mechanism for returning the cable guides 150 to their original starting point, other arrangements are envisaged. It is also envisaged that other arrangements may be put into place to prevent the cable guides 150 from lowering to their original starting point once the offset brackets 160 are disconnected from the shelf-frame 30.

Figure 8:
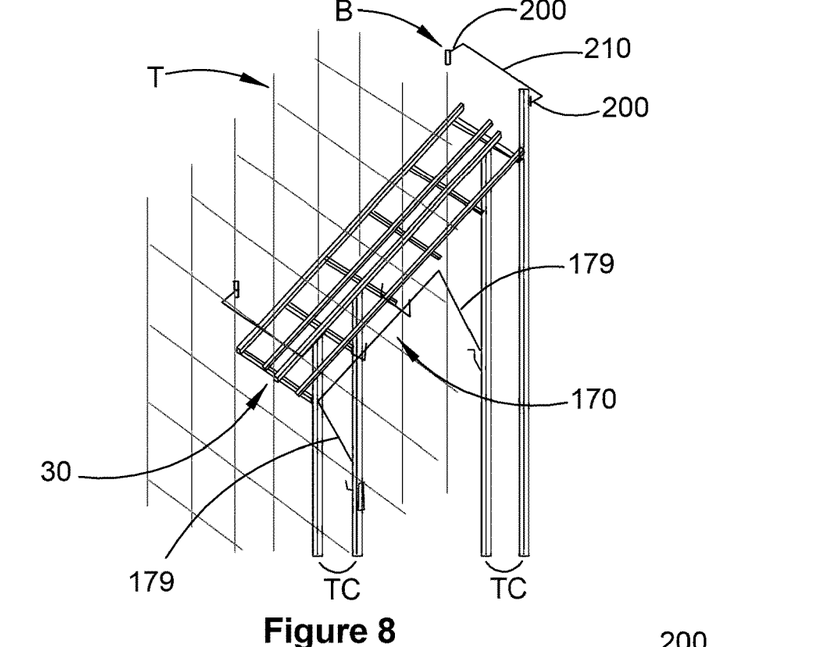
FIG. 8 is an isometric view of a racking tower with a shelf-frame secured in the uppermost position.

FIG. 8 illustrates the uppermost shelf-frame 30 secured in position in the tower T. In this Figure, the lifting support 170 has been released from the shelf-frame 30 and has been lowered to a position just below the shelf-frame 30. The connection of the crane to the crane hook 178 of the lifting support 170 is still retained. The connection of the offset brackets 160 to the ends of the lifting support 170 via chains 179 is also shown in this Figure.

FIG. 8 also shows that prior to the secure connection of all of the shelf-frames 30 between the second and third rows B, C, of upright members 20, the outer most upright members of the third row C should, for stability reasons, be temporarily secured to the outer most upright members of the second row B. If they are not so secured, the truss columns TC of the third row C may be unstable. Securing the positioning of the uprights of these truss columns TC should ideally be done in a way that does not interfere with lifting of the uppermost shelf-frame 30 into position from the ground.

Accordingly, in this embodiment, an outrigger arm 200 is attached to each of the outer most uprights 20 of the second and third rows B, C adjacent the upper most end (i.e. an outrigger arm 200 is attached to a first upright member and another outrigger arm 200 is attached to a second upright member). Each outrigger arm 200 extends outwardly towards the nearest crane aisle CA and in doing so does not infringe on the ability of the uppermost shelf-frame 30 to be moved into the required position between the second and third rows B, C of upright members 20. It will be appreciated that the crane aisle CA represents an open area that is outside the particular tower of the racking bay.

The outrigger arms 200 of the first and second upright members are joined by a link arm 210 to establish a temporary brace. In this way the outer most truss columns TC of the third row C are temporarily, but securely, connected to the adjacent truss columns of the second row B and thus the finished section of the racking bay RB.

Figure 9:
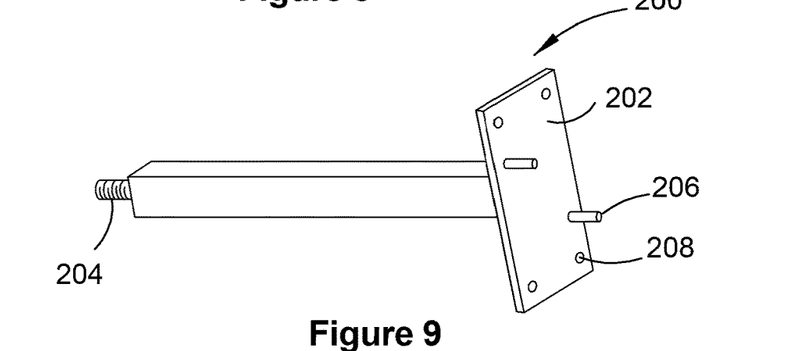
FIG. 9 is an isometric view of an outrigger arm in accordance with an embodiment of an aspect of the invention.
Figure 10:
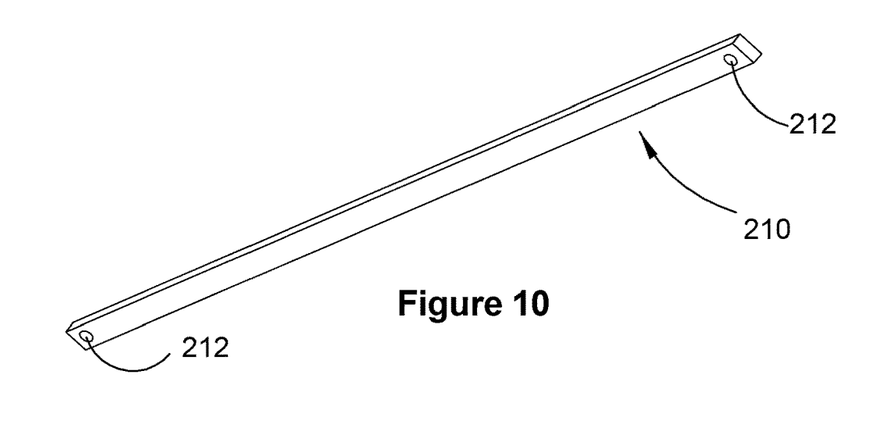
FIG. 10 is an isometric view of a link arm in accordance with an embodiment of an aspect of the invention.

FIG. 9 illustrates the outrigger arm 200 in more detail and FIG. 10 illustrates the link arm 210 in more detail. Outrigger arm 200 has a plate 202 at one end configured to enable bolted attachment to the upright 20 and a threaded rod 204 at the other to enable connection to the link arm 210. In FIG. 9, two bolts 206 are shown extending through apertures 208 of the plate 202. The plate 202 is shown as including eight apertures 208 for bolts, but other numbers of apertures and bolts are envisaged.

Link arm 210 has an aperture 212 in each end through which the threaded rod 204 of an associated outrigger arm 200 may pass. A nut (not shown) would be threaded onto the end of the rod 204 after it has passed through the aperture 212 and thus used to secure the link arm 210 to the outrigger arm 200.

Given the overall length of the truss columns TC (i.e. height of the truss columns TC), it may be necessary to provide such a temporary brace at a number of points along the length of the truss columns TC. More particularly, the truss column TC may include a number of sections joined together to establish the full height of the truss column TC. In that event, it would be advisable to include at least one temporary brace on each section of the truss column TC.

Once all of the shelf-frames 30 between the second and third rows B, C have been installed, the missing middle truss column TC of the third row C must be installed thereby completing the third row C and the tower T.

To enlarge the tower T, another row of truss columns TC fitted with shelf-frames 30 can be established. This would be done in the same way as previously described in relation to the installation of shelf-frames 30 between the second and third rows B, C.

It will be noted that the outermost upright members 20 of the new fourth row will best be stabilised using a temporary brace. This can be done by releasing the connection between the outrigger arm 200 that is connected to the first upright of the truss column of the second row B, and then moving that outrigger arm 200 with connected link arm 210 from the first position to a second position. The link arm 210 with connected outrigger arm 200 can be swung by the riggers around 180° so that the disconnected first outrigger arm 200 can then be connected to the outermost upright member 20 of the new fourth row (i.e. a third upright). During this process, the second outrigger arm 200, that is the one connected to the upright member of the truss column of the third row C (i.e. the second upright member), remains connected to the second upright member via the plate 202 thereof. It may be necessary to slacken off the associated nut of that second outrigger arm 200 in order to enable the link arm 210 to rotate about the threaded rod 204 thereof from the first position to the second position. Further, during this process, the link arm 210 remains in the open area.

As an alternative methodology, the outrigger arm 200 connected to the first upright of the truss column of the second row B may be left connected thereto. However, the end of the link arm 210 connected to that outrigger arm 200 is released and then moved from the first position to the second position. When in the second position, the end of the link arm 210 can be connected to a third outrigger arm 200 that was previously connected to the outermost upright member 20 of the new fourth row.

As mentioned previously, it is useful to prevent lateral movement of the guide cables 110A, 110B. This can be facilitated by providing a number of cable guides 140 along the length of each guide cable 110A, 110B. Each cable guide 140 is positioned so that its associated cable 110A, 110B runs through the V-shaped outer end 144b of the guide member 144 when the guide cable is in its required position. The V-shaped outer end 144b restricts lateral movement of the guide cable 110A, 110B. However, as will be better appreciated from FIG. 4A, the V-shaped outer end 144b of each cable guide 140 must be able to move out of the way of the roller guide 150 as the roller guide 150 travels along the cable 110A. This is why each guide member 144 is preferably spring loaded for pivotal movement about axis $A_1$. Such movement allows the guide member 144 to move from the neutral position to an upward position when the V-shaped outer end 144b is contacted from underneath by the U-shaped body 152 of the roller guide 150. Once the roller guide 150 clears the cable guide 140, the guide member 144 will return, under the spring bias, to the neutral position. It will of course be appreciated, that when the roller guide 150 is pulled downwardly along the guide cable 110A to return it to ground level, the guide member 144 will be caused to move to a downward position to allow the roller guide 150 to pass. It then springs back to the neutral position.

Figure 4A:
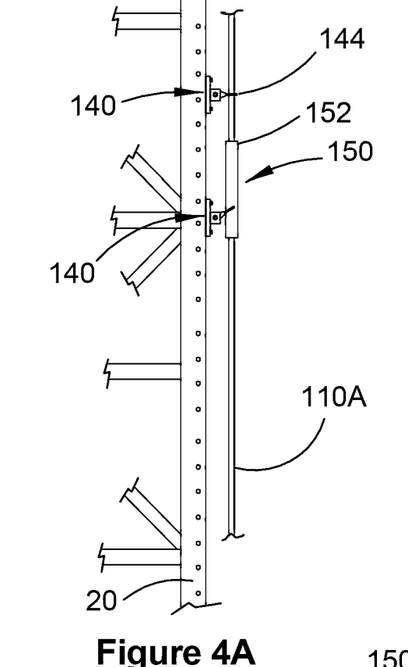
FIG. 4a is a side view showing two cable guides connected to an upright member and a roller guide passing one of the cable guides.

To ensure the desired orientation of the cable 110A, 110B along its full length, it is envisaged that multiple cable guides 140 may need to be installed along the length of each upright 20A, 20B. Further, they should preferably be spaced so that when the V-shaped outer end 144b of one cable guide 140 is not limiting lateral movement of the cable 110A, 110B due to it being moved away from the neutral position, another cable guide 140 will still act to control that lateral movement. To this end, it is envisaged that the cable guides 140 would be paired along the length of each upright 20A, 20B and positioned so that when one cable guide 140 is not limiting lateral movement of the guide cable 110A, 110b, the cable guide 140 immediately above or below will do so. This paired nature of the cable guides 140 along upright 20A is illustrated in FIG. 4A.

It should also be understood that the configuration of the offset bracket 160 can be readily changed to take into account the size and the required predetermined angular orientation of the shelf-frame 30 to be connected thereto. As will be apparent, the predetermined angular orientation will depend on factors such as the size and shape of the shelf-frame, the spacing between adjacent rows of the racking bay RB through which the shelf-frame is to be moved, and any other impediment to movement of the shelf-frame as it is being lifted into position. If necessary, the offset bracket 160 can be quickly disconnected from the roller guide 150 and replaced with a different one.

It will also be appreciated that by minimising the friction between the guide cables 110A, 110b and the roller guides 150, it will be possible to ensure even better control of the movement of the roller guides 150 and thus the shelf-frame 30. This enables the desired clearances between the shelf-frame 30 and truss columns TC to be maintained, minimising the risk of any accidental impact to the truss columns TC or any surrounding structure.

It will also be appreciated by those skilled in the art that the lifting support 170 as previously described may be replaced with other forms of lifting support. For example, the shelf-frame 30 being moved could be supported on a lifting beam which is connected to the crane via a pair of soft slings or lengths of wire rope.

The preferred embodiment of the invention that utilises a guided movement method is advantageous because it provides controlled movement of the shelf-frame being lifted into position. This assists with the shelf-frame being moved by a crane in confined environments in a safer manner and preferably at greater hoisting speeds than might otherwise be possible. This in turn can speed up construction times when the method is used to lift construction elements into position.

The embodiments have been described by way of example only and modifications within the spirit and scope of the invention are envisaged.

The invention claimed is:

1. A racking bay tower construction method, the racking bay including upright members with shelf-frames installed therebetween, the construction method including use of a method of moving an item, the item being a preassembled shelf-frame, between adjacent upright members of a racking bay tower, the shelf-frame moving method including:
   a. mounting a first preassembled shelf-frame onto a jig table such that the shelf-frame is in an angular orientation; and
   b. lifting the first shelf-frame from the jig table, the jig table being positioned between lower ends of adjacent upright members, to an installation position between upper ends of the adjacent upright members, while maintaining the angular position of the first shelf-frame, and then installing the first shelf-frame in a desired orientation in its installation position; and then
   c. mounting a second preassembled shelf-frame onto a jig table such that the second shelf-frame is in an angular orientation; and
   d. lifting the second shelf-frame from the jig table, the jig table being positioned between lower ends of adjacent upright members, to an installation position between upper ends of the adjacent upright members but below the installation position of the first shelf-frame, while maintaining the angular position of the first shelf-frame, and then installing the second shelf-frame in a desired orientation in its installation position;
   wherein the mounting, and the lifting and installing, of subsequent shelf-frames is repeated until the racking bay tower is constructed.

2. A racking bay tower construction method according to claim 1, wherein the jig table with the first preassembled shelf-frame mounted thereon is moved to the position between the lower ends of adjacent upright members before the first shelf-frame is lifted from the jig table in step (b), and the jig table with the second preassembled shelf-frame mounted thereon is moved to the position between the lower ends of adjacent upright members before the second shelf-frame is lifted from the jig table in step (d), and the jig table with subsequent preassembled shelf-frames mounted thereon is moved to the position between the lower ends of adjacent upright members before the subsequent shelf-frames are lifted from the jig table.

3. A racking bay tower construction method according to claim 1, including lifting shelf-frames from a jig table to an installation position in conjunction with a moving system that guides the movement of the shelf-frames.

4. A racking bay tower construction method according to claim 3, wherein the moving system includes: a first guide cable mounted between first and second mounting points; a first member arranged for movement along the first guide cable between a first position and a second position, the first member arranged for connection to a shelf-frame to be craned into position; a second guide cable mounted between first and second mounting points, a second member arranged for movement along the second guide cable between a first position and a second position, the second member arranged for connection to the shelf-frame to be craned into position; a lifting support arranged for connection to a moving device and to provide support for the shelf-frame during movement; and wherein when the shelf-frame is connected to each of the first and second members, the shelf-frame is set by that connection at a predetermined orientation and when the lifting support is moved by the moving device the first and second members move along their respective guide cables and maintain the shelf-frame substantially at the predetermined angular orientation.

5. A racking bay tower construction method according to claim 4, wherein the lifting support includes a lifting beam which supports the shelf-frame and thereby enables movement of the shelf-frame when the lifting support is moved.

6. A racking bay tower construction method according to claim 4, wherein the first and second guide cables each establish a path of travel along which their associated first or second member can be moved and wherein that path of travel is substantially repeatable each time the associated first or second member is moved therealong.

7. A racking bay tower construction method according to claim 4, wherein the first and second guide cables are restrained at points along their length so as to limit movement of the guide cables.

8. A racking bay tower construction method according to claim 4, wherein the first and second guide cables are arranged to extend substantially vertically and are each arranged to be mounted on a respective upright member.

9. A racking bay tower construction method according to claim 4, wherein each of the first and second members includes a moving member which is configured to engage with its respective guide cable so as to be guided to move along the path of travel established by the guide cable.

10. A racking bay tower construction method according to claim 4, wherein the first and second moving members each include a roller guide with a series of paired rollers, the guide cable being arranged to run between each pair of rollers.

11. A racking bay tower construction method according to claim 4, further including an offset arrangement or bracket, the offset arrangement or bracket providing a connection point for connection with the shelf-frame and which offsets the shelf-frame to a required position.

12. A racking bay tower construction method according to claim 11, wherein the offset bracket is shaped to offset the shelf-frame relative to the guide cable and/or other adjacent structure(s) so as to prevent the shelf-frame contacting the same when the shelf-frame is moved under the action of the moving device.

13. A racking bay tower construction method according to claim 12, wherein the offset bracket holds the shelf-frame at a required orientation so as to enable the shelf-frame to fit between the guide cable and/or other adjacent structure(s) as the shelf-frame is being moved by the moving device.

14. A jig table when used in the racking bay tower construction method according to claim 1, the jig table including a frame configured to hold a pre-assembled shelf-frame in an angled position.

15. A preassembled shelf-frame when used in the racking bay tower construction method according to claim 1, the shelf-frame including at least two longitudinal members and at least two cross members connected together to form an assembled unit.

16. A racking bay tower constructed by the method of claim 1, the tower including upright members connected by shelf-frames.

* * * * *